United States Patent [19]
Stofko

[11] Patent Number: 4,654,259
[45] Date of Patent: Mar. 31, 1987

[54] METHOD AND COMPOSITION FOR BONDING SOLID LIGNOCELLULOSIC MATERIAL

[75] Inventor: John Stofko, Beaverton, Oreg.

[73] Assignee: Carbocol Inc., Beaverton, Oreg.

[21] Appl. No.: 761,793

[22] Filed: Aug. 2, 1985

Related U.S. Application Data

[63] Continuation-in-part of Ser. No. 580,157, Feb. 14, 1984, abandoned.

[51] Int. Cl.⁴ .............................................. B32B 23/00
[52] U.S. Cl. .................... 428/326; 156/307.3; 156/328; 264/128; 428/528; 428/529; 428/533; 524/56; 524/58
[58] Field of Search .................... 156/307.3, 328; 428/528, 533, 529, 326; 524/56, 58; 264/128

[56] References Cited

U.S. PATENT DOCUMENTS

| 2,773,848 | 12/1956 | Lindenfelser | 524/58 |
| 3,022,258 | 2/1962 | Berry | 524/56 |
| 3,440,189 | 4/1969 | Sharp | 428/326 |
| 3,865,616 | 2/1975 | Åkerblom | 524/58 |
| 4,357,194 | 11/1982 | Stofko | 156/336 |
| 4,397,756 | 8/1983 | Lehmann | 156/328 |

Primary Examiner—John J. Gallagher
Attorney, Agent, or Firm—Browdy & Neimark

[57] ABSTRACT

Wood surfaces are bonded together by heating and pressing with a bonding composition containing, on a bonding agent solids basis, from 10–70% of one or more sugars and from 90–30% of an aminoplast, and the bonding composition being used in an amount equal to the amount of straight condensation resin which would normally be used, i.e. the sugar replaces a quantity of condensation resin normally used thereby reducing the total quantity of condensation resin, thereby reducing cost and formaldehyde emissions and without any disadvantages.

16 Claims, No Drawings

METHOD AND COMPOSITION FOR BONDING SOLID LIGNOCELLULOSIC MATERIAL

This is a continuation-in-part of parent application Ser. No. 580,157, filed Feb. 14, 1984, now abandoned, the entire contents of which are incorporated by reference. This continuation-in-part is made without prejudice and explicitly without admission of any defect of parent application Ser. No. 580,157, and without concession of the propriety of any rejection of said parent application.

FIELD OF THE INVENTION

The present invention relates to the bonding of wood surfaces, especially in the manufacture of composite wood products of all types including but not limited to boards comprising similar or dissimilar sizes and shapes of various lignocellulosic materials such as fiberboard, waferboard, particleboard, etc., hereinafter referred to as composite wood products.

BACKGROUND OF THE INVENTION

At the present time, the major bonding systems being used in the manufacture of composite products of wood still utilize resin condensates of formaldehyde with urea, melamine or with phenol or other phenolics. As a result of general economic conditions and especially the recently increased cost of petrochemicals, there is a continuous pressure to reduce the cost involved in employing these resins in the manufacture of wood products. In addition, urea-formaldehyde resin releases formaldehyde which is carcinogenic and an eye and mucosa irritant, thus creating a possible health problem.

Adhesives based on carbohydrates, such as starches or sugars, which are converted to binders by various means, have also been suggested and have been adopted to some extent. Carbohydrate binders have an important advantage in lower production costs and zero formaldehyde emission from products. On the other hand, synthetic resin binders based on the condensation of formaldehyde with urea, melamine or phenol have a significant advantage over carbohydrate binders in low curing temperature and short curing times, which are important production cost affecting factors.

Urea and melamine-formaldehyde resins cure at 212° F. in 13 to 45 seconds, depending on the formulation. Phenolformaldehyde resins cure at 220° F. in about 90 seconds. However, carbohydrate adhesives normally need temperatures of at least 280° F. to cure and the minimum cure time is about two minutes. The higher curing temperatures and longer curing times of carbohydrate binders can be reduced by using more efficient heat transfer systems such as steam injection pressing, as disclosed in Stofko U.S. Pat. No. 4,357,194, but application of this heating system requires sophisticated presses and more capital investment (also see Stofko U.S. Pat. Nos. 4,409,170 and 4,504,205). Thus, an improved binding system employing carbohydrates is disclosed in Stofko U.S. Pat. No. 4,357,194, which further teaches the addition of lignin or phenolics containing lignin to the carbohydrate bonding system.

There is also a large body of art directed to the manufacture of resins which are the condensation polymers of carbohydrates, formaldehyde and a member selected from the group consisting of urea and melamine. However, none of such art has been directed to and claims (a) wood bonding using a mixture of urea formaldehyde resin or melamine formaldehyde resin and sugars by transforming them to binders in situ -on wood surface-in a hot press; (b) a substantial replacement of urea formaldehyde or melamine formaldehyde resins by sugars resulting in a significant reduction of formaldehyde emission while maintaining or improving the quality of bonding; and (c) a significant reduction of cost of bonding which is inherent in the present invention.

For examples of such art see U.S. Pat. Nos. 2,252,725; 3,284,381 and 1,949,831. Thus, Ford in U.S. Pat. No. 1,949,831 proposes a process for producing durable resinous or plastic substances of a saccharide, urea and formaldehyde by reacting first 63.15% of a saccharide with 18.95% of formaldehyde and 2.1% of hexamethylenetetramine at temperatures below 100° C., followed by reacting a product of the first reaction with 15.79% urea at temperatures of 100°-150° C. The final product is a white plastic powder suitable for molding in a press; there is no suggestion of the use of this product for bonding wood. In his related patent, 1,949,832, Ford proposes reacting the condensation product of saccharide and formaldehyde with phthalic anhydride instead of with urea, the ratio of anhydride and saccharide being about 1:1, to again produce a moldable plastic powder.

Hickey et al in U.S. Pat. No. 3,284,381 propose an improvement of starch adhesive for corrugated paperboard, by using amylose instead of starch. In order to increase the water-resistance, a quantity of 0.33-2.7% of urea and 0.65-2.7% paraformaldehyde are added to the amylose together with other ingredients. The preparation of this starch adhesive involves several steps of mixing and cooking.

U.S. Pat. No. 2,252,725 describes a process for producing a glucose-phenol-formaldehyde resin in which glucose is substituted for about 30% of the phenol. Other attempts also have been made to produce a sucrose-phenol-formaldehyde resin; for example, the International Sugar Institute has conducted research and has issued a research report on the preparation of sucrose-phenol-formaldehyde resin for the manufacture of plywood.

Other prior proposals of some interest include the Olix U.S. Pat. No. 2,736,678, in which there is proposed the production of sugar-urea-formaldehyde resin by reacting 63.4% sugar with 18.88% formaldehyde at 100° C., followed by reacting a product of the first reaction with 15.8% urea at the same temperature. The resultant resin is proposed as an ingredient in silica-clay-starch ester adhesive, the patentee indicating that the performance of such an adhesive is enhanced by adding a small quantity, i.e. 1-8%, of such sugar-urea-formaldehyde resin to the basic composition intended for the bonding of corrugated paperboard.

Bowen in U.S. Pat. No. 2,150,148 has proposed a binder for plywood manufacture composed of urea, formaldehyde and zinc chloride. This patent further indicates that if 0.43% of sucrose is added to the mixture before cooking the resin, some advantages are achieved over the conventional urea-formaldehyde resins.

The Hoffmann U.S. Pat. No. 3,984,275 proposes a binder formulation for corrugated paperboard composed of starch, polyvinylacetate and vinyl acetate-ethylene copolymer, the ratio of the starch to the other components being 1:1. For the purpose of increasing the water-resistance of such binder, a small amount, i.e. less than 1%, of either urea-formaldehyde or melamine-formaldehyde is added to the adhesive composition.

Another improvement of starch adhesive for corrugated paperboard appears in Bauer U.S. Pat. No. 3,019,120, where it is suggested to incorporate cyanamide or an alkaline salt thereof which improves the water-resistance of the starch adhesive, if the cyanamide is used as a supplementary reactant with urea-formaldehyde at high alkalinity. The urea formaldehyde represents only 0.5–5% of the total weight of the starch.

Christ in U.S. Pat. No. 3,076,772 proposes a process for producing urea-phenol-formaldehyde resin extended by sulfite spent liquor. A special urea-phenol-formaldehyde resin of molar ratio 1 part urea, 5 parts phenol, 12 parts formaldehyde and 1.25 parts sodium hydroxide was formulated to make it compatible with sulfite spent liquor. There was about 50% of urea-phenol-formaldehyde resin, 27.46% of lignosulfonic acid, 8.57% of reducing sugars and small quantities of other substances in the final product.

An analysis of these prior disclosures show that they can be classified into two groups. In the first of these groups, resins or plastic substances have been produced of either sugar-urea-formaldehyde or sugar-phenol-formaldehyde. The basic feature of these processes is that new resins were prepared by cooking, using a definite sequence of reacting components by exposing them to elevated temperature, pressure and time. Final products are indicated to be useful as binders or plastic materials for molding. The products have a ratio of sugars to formaldehyde and urea on the order of 63:19:16. In the formation of sugar-phenol-formaldehyde, about 30% of phenol was substituted by sucrose giving the ratio of phenol:sucrose:formaldehyde of 35:15:50; taking into account additional materials in the mixes, the sugars constitute about 8.5% of the total resin solids.

In the second group of such prior documents, small amounts of carbohydrates were used as ingredients in producing urea-formaldehyde resins, or small amounts of urea-formaldehyde resins were used as ingredients in carbohydrate binders. Thus, 0.43% sucrose was used in cooking the urea formaldehyde-zinc chloride resins according to Bowen U.S. Pat. No. 2,150,148; less than 1% of either urea or melamine formaldehyde resins were used in cooking the starch-polyvinyl acetate binder according to Hoffmann U.S. Pat. No. 3,984,275; and 0.33–5% of urea formaldehyde was used in the preparation of starch adhesives according to Hickey U.S. Pat. No. 3,284,381 and Bauer U.S. Pat. No. 3,019,120.

U.S. Pat. No. 4,397,756 to Lehmann discloses a method of reducing formaldehyde vapor emissions from particleboards bonded with urea formaldehyde resin by adding a mixture of urea and starch to urea formaldehyde resin.

U.S. Pat. No. 3,022,258, in the name of Berry, discloses an aqueous wood finishing composition of urea-formaldehyde condensate, sugar and solvent. The solids composition may range from 1:1 to 1:3 of sugar to resin solids. The composition serves as a filler-sealer and there is no indication that the composition would act as a bonding agent in the manufacture of solid wood products from wood particles, nor that the sugar has a bonding function and can replace a quantity of urea-formaldehyde condensate; instead, the sugar is said to aid in the dispersion of the resin, to serve as a filler, and also to aid in the sanding of the hardened film.

U.S. Pat. No. 3,562,060, in the name of Stevens, concerns only a typical phenoplast or aminoplast condensation resin, the novel aspect being the inclusion of an accelerator which is an hydroperoxide. Up to 20 weight percent of filler may be included, such as wood flour, walnut shell flour and the like, but these fillers are inert, not adhesive.

U.S. Pat. No. 2,773,848, in the name of Lindenfelser, concerns an aminoplast laminating resin for use in the manufacture of high pressure, decorative laminates of the FORMICA and NEVAMAR type. The patentee indicates that the inclusion of sugar had a tendency to eliminate the problem of laminate bleeding, i.e. a tendency for the resin material of the core assembly to migrate into the print sheet causing discloration; but that sugars are unsatisfactory because of inconsistent results. According to Lindenfelser, the problem is overcome by the use of an alpha alkyl-D-glucoside as an additive. Again, there is no indication that such a resin will serve to adequately bond wood particles to make a satisfactory particleboard product, or that the glucoside can serve as a replacement for a portion of the aminoplast without diminution of the adhesive properties.

SUMMARY OF THE INVENTION

It has now been determined that fully satisfactory bonding of wood particles to obtain high quality composite products can be achieved by replacing a significant portion of the formaldehyde condensation resins with sugar. These fully satisfactory bonding agents based upon sugars and reduced quantities of formaldehyde resins can be prepared by simple blending without the necessity of reacting the sugars with the resins at elevated temperatures prior to applying them as binders to wood surfaces if proper ratios of ingredients are used. Blends of 10% to 70% of sugars and 90% to 30% of resins can be employed. Blends of 10% to 60% of sugars and 90% to 40% of urea-or blends of 10% to 70% of sugars and 90%–30% of melamine-formaldehyde resin have been found to produce bonds in interior grade products virtually equal in physical properties to bonds achieved by straight urea-or melamine-formaldehyde resins at equal total quantity levels of addition. The percentages given above refer to percentages by weight based upon dry solids of the bonding agent exclusive of catalyst and buffer.

The bonding agents of the present invention are normally applied to the surfaces of the wood particles as a water solution or suspension as are the resins of the prior art. For example, the wood particles can be sprayed with respective sugars and resin solutions from separate sprayers, or the condensation resin can be first admixed with the sugar solution and the mixture sprayed onto the wood particles.

The catalysts which can be used to speed up the cure of the adhesive include the catalysts used to make the formaldehyde resin condensation products of the prior art. When an acid catalyst is employed which is so acidic that it would damage the wood being bonded, it is also preferable that a buffer be present to prevent the acid damage as disclosed in Stofko U.S. Pat. No. 4,183,997. The wood products made in the practice of the present invention are virtually free of or significantly lower in formaldehyde emissions.

An important advantage of the present invention is that the present bonding agents are significantly less expensive than the formaldehyde condensation products of the prior art, due to the replacement by the less expensive sugar of a significant quantity of the more expensive condensation resin on essentially an equal weight basis; at the same time, these new bonding agents in general are usable to provide excellent bonded wood products using the curing temperatures and times of the aldehyde condensation adhesives of the prior art, thereby obviating the deficiencies inherent in the use of the carbohydrate bonding agents of the prior art which required more intensive curing cycles.

For a better understanding of the invention, as well as the objects and the nature and advantages thereof, possible embodiments of the invention will now be described in more detail, it being understood that these embodiments are intended to be merely exemplary and in no way limitative.

DETAILED DESCRIPTION OF EMBODIMENTS

According to one embodiment of the invention, surfaces to be bonded are covered either by a continuous or discontinuous film, e.g. by a mist of droplets, of an unreacted blend containing one or more sugars, and an incompletely condensed aldehyde condensation resin selected from the class consisting of urea-formaldehyde, melamineformaldehyde, and mixtures thereof, and with or without a separate catalyst and/or buffer, depending upon the nature of the ingredients and the curing system used. The total quantity of bonding agent solids, namely sugar plus condensation resin, is in accord with conventional practice in this art using condensation product alone and generally ranges from about 4.0-12% bonding agent solids based on the weight of the wood particles. The so coated wood particles are brought into contact with each other and are consolidated by the application of conventional levels of heat and pressure for a time sufficient to effect the bonding by chemical transformation of the components. Steam pressing according to Stofko U.S. Pat. Nos. 4,357,194; 4,409,170 and 4,504,290 can also be used to great advantage.

The curing temperatures and times of sugar-synthetic resin binders are dependent on the ratio of sugars and synthetic resins in blends. At the ratio of 10-70% sugars, preferably at least 15%, most preferably at least 30-40% sugars, and 90-30% urea-formaldehyde or melamine-formaldehyde, cost savings are significant because of the reduced quantity of condensation resin, and curing temperatures and times are generally equal to those of straight 100% condensation resins. If amounts of sugars in blends are higher than indicated, either longer curing times or higher curing temperature or both have to be applied. If less sugar than about 10% is used then the cost savings begin to approach the insignificant and the reduction of formaldehyde emissions is not sufficiently great.

For example, as to particleboard, it is usually produced as three layer sandwich panels in which the central layer is of a lower density than the surface layers. In surface layers which are closer to the press platens, blends of higher sugar content can be used than in the core, without the necessity of extending press times or increasing curing temperatures, especially in the absence of steam pressing.

The bonding system of the present invention has the advantage of achieving the benefits of both carbohydrate bonding agents and synthetic condensation resin bonding agents. The presence of the synthetic condensation resin results in a reduction of the curing temperatures and curing times to the levels of straight 100% condensation resins, which is considerably less than the curing temperatures and curing times required when using straight carbohydrate bonding agents in the absence of steam curing. On the other hand, the presence of significant quantities of the carbohydrate at the same time reduces raw material cost and formaldehyde emissions, compared with the use of the straight condensation resin. Thus, in practicing processes according to the present invention, advantages of both groups of bonding agents are achieved; the low curing temperature and times of synthetic condensation resins, e.g. in less than 1 minute at 100°-125° C. and the low cost and the low formaldehyde emission of carbohydrate bonding agents are achieved.

As indicated above, the quantity of bonding agent used according to the present invention is approximately the same as that used in accordance with conventional practice when the bonding agent is straight condensation resin, i.e. generally about 4-12% bonding agent solids based on the weight of the wood particles. For example, if 8% urea-formaldehyde resin solids, based on the wood particles, is normally used, then 8% (again based on the weight of the wood particles) of a mixture of 40% sugar and 60% urea-formaldehyde is used to achieve the same results as the 8% straight urea-formaldehyde; in parts by weight, then, 4.8 parts of urea-formaldehyde plus 3.2 parts of sugar replace 8 parts of straight urea-formaldehyde per 100 parts of wood.

By some mechanism which is not understood, the synthetic resins seem to perform a catalytic function for carbohydrate transformation to provide a solid bond. Sugars combine chemically with synthetic condensation resins, which is evidenced by the fact that the condensation products of sugars and synthetic resins do not dissolve in water. At the present time, this chemical coupling cannot be explained; however, it can be concluded that dehydration of sugars to furanes and coupling thereof to lignin does not take place because a curing temperature of 212°-220° F. is not sufficient for such transformation. Strength of bonding of the present invention is equal to bond strength achieved by straight synthetic condensation resins under comparable conditions.

A wide variety of sugars such as mono-, di- or polysacharides of low molecular weight or mixtures thereof can be used. Preferred are low cost mixtures of sacharides such as molasses and wood sugars derived as by-products from wood pulping, or from wet process fiberboard production. The preferred mixture is a blend of cane molasses and wood sugars containing lignin sulfonates such as sulfite liquor. Molasses is the source of sugars and sulfite liquor is the source of both sugars and lignosulfonic acid catalyst. It also acts as a stabilizing agent for molasses, controlling the viscosity changes of molasses at varying temperature.

The approximate basic compositions of cane molasses and sulfite liquor and a 50%-50% mixture thereof are as follows:

| Components Percent | Cane Molasses | Sulfite Liquor | 50/50 Blend Cane Molasses and Sulfite Liquor |
|---|---|---|---|
| invert sugars | 32 | — | 18.85 |
| reducing sugars | 32 | 22 | 27.87 |
| complex sugars and other carbohydrates | 18 | 20 | 18.85 |
| proteins | 4.17 | — | 2.46 |
| lignin sulfonate | — | 50 | 20.49 |
| ash | 13.9 | 8 | 11.48 |
| total | 100 | 100 | 100 |

-continued

| Components Percent | Cane Molasses | Sulfite Liquor | 50/50 Blend Cane Molasses and Sulfite Liquor |
|---|---|---|---|
| total sugars and carbohydrates | 82 | 42 | 60.55 |

A wide range of blends of cane molasses and sulfite liquor can be used, for example in ratios of 100% molasses and 0% sulfite liquor to 40% molasses and 60% sulfite liquor. Sugar containing materials such as sucrose, molasses, corn syrup, maltose base waste products from breweries or lactose based waste products from the dairy industry can be used either alone or in blends with wood sugars containing lignin including sodium, ammonium, calcium or magnesium based salts. Sugar containing materials can be used alone without any lignin sulfonate. In such cases acidic catalyst is used to effect a cure in a reasonably short time as disclosed in Stofko U.S. Pat. No. 4,107,379 (also see Stofko U.S. Pat. No. 4,183,997).

The performance of such bonding agents, based on blends of sugars and synthetic resins, is dependent upon several conditions including ratio of sugars and resins for a given curing temperature and time; pH of components; resin formulation, including molar ratio of components, molecular weight and ingredients; and the amount and type of catalyst used.

As a rule the pH of the sugars should be about equal to the pH of the synthetic resins, but, depending on the urea or melamine-formaldehyde resin type, the pH of the sugars can be significantly lower or higher than the pH of the synthetic resins. If the pH of the sugars is lower than the pH of the urea- or melamine-formaldehyde resins, the sugars have a catalytic affect on the resins, speeding up curing, reducing the need for additional catalyst and shortening the curing time as well as of the storage life of blends. If the pH of sugars is equal to or higher than the pH of the resins of urea or melamine type resins, catalysts have to be added to effect a cure at times equal to that of straight resins. The storage life of such blends is about equal to that of straight resins.

In general, the pH of sugars for blending with synthetic resins will be between 3 and 12. Low pH sugars will be used with some resins which can tolerate more acidic environment and need catalyzing, and it is desirable to catalyze them with sugars and where storage life time is of no great importance. The pH of sugars for blending with urea- or melamine-formaldelyde resins is between 3 and 9. Sugars of pH 3-5 catalyze urea-formaldehyde resins so that no additional catalyst need to be added.

There are a wide variety of synthetic formaldehyde condensation resins on the market, and these can all be used in the present invention. Variability is created by variable molar ratios of components, internal catalysts and modifying agents, molecular weight and other factors. The formulation of sugars in terms of pH, catalysts and the ratio of sugars to other components has to be determined experimentally for each particular resin to make the blend compatible. Many resins have been examined and good compatibility has been achieved with all.

Blends of sugars with urea- or melamine-formaldehyde resins are catalyzed by the same catalysts as are used to catalyze the straight resins. The most widely used catalysts are ammonium chloride, ammonium sulfate, ammonium nitrate and sodium chloride. Amounts of catalysts to be used are variable depending on several factors such as the pH of the sugars, resins and wood, resin type and resin formulation. Amounts of 0.5 to 2.5% of catalyst solids to the weight of liquid resin base are most common.

Sugars can be blended with catalysts prior to blending them with the synthetic condensation resins or they can be blended with the synthetic condensation resins first stored and then shipped as such blends, and catalyst added to blends immediately prior to applying them to wood, or a catalyst solution can be applied to the wood particle separately, or separate solutions of sugars and condensation resins can be applied either of which contains catalyst.

The following examples, offered illustratively, will illustrate ways of practical application of this bonding process.

EXAMPLE 1

Mixed softwood shavings of 2.5% moisture content were sprayed with a water solution containing, based on solids, 70% of urea-formaldehyde resin (UF resin) and 30% of sugars. Particle-board samples of ⅝ or ¾ inch thickness were made at conditions which are listed in Table 1 and the achieved physical properties of the boards are listed in Table 2. Samples designated by Samples No. 1, 2 and 3 were control samples made using straight urea-formaldehyde resin and Sample No. 1a, 2a; 3a represent data obtained on samples made using a blend of the same urea-formaldehyde resins with sugar composition specified in Table 1. It has been verified on a larger number of laboratory trials of which the presented data in this example is only a small fraction, as well as on full scale production trials, that sugar/UF resin blends produce properties equivalent to straight resins at equivalent conditions.

TABLE 1

| | Sugars-UF resin % to oven dry wood | | | | | | | |
|---|---|---|---|---|---|---|---|---|
| No. | total | UF | sugars | lignin sulfon. | pH | Catalyst % | Platen temp. °F. | Press time minutes |
| 1 | 7.5 | RCI 7.5 | zero | zero | — | NH$_4$Cl .75 | 340 | 5 |
| 1a | 7.5 | 5.25 | 1.67 | .59 | 5.5 | NH$_4$Cl .75 | " | " |
| 2 | 5.75 | Borden 12C11CF 5.75 | zero | zero | — | NH$_4$Cl .75 | 370 | 4.5 |
| 2a | 5.75 | 4.03 | 1.28 | .45 | 5.0 | NH$_4$Cl .75 | " | " |
| 3 | 8.0 | RCI 99063 | zero | zero | — | (NH$_4$)$_2$SO$_4$ | 375 | 2'45" |

TABLE 1-continued

| | Sugars-UF resin % to oven dry wood | | | | | | | |
|---|---|---|---|---|---|---|---|---|
| No. | total | UF | sugars | lignin sulfon. | pH | Catalyst % | Platen temp. °F. | Press time minutes |
| 3a | 8.3 | 8.0 5.81 | 2.49 | zero | 6.55 | 2 (NH$_4$)$_2$SO$_4$ 2 | " | " |

RCI = Reichhold Chemicals Ltd; Borden = Borden Chemicals Ltd.

As is seen from these data, urea-formaldehyde resin solids represent 70% of the total and sugars solids represent 22.27 or 30% of the total and salt of lignosulfonic acid catalyst represents 7.87% of the total.

TABLE 2

| | | | | 24 hrs soaking in H$_2$O | |
|---|---|---|---|---|---|
| No. | Thickness inch | Density lb/ft$^3$ | Internal bond psi | % thickness swell. | % water absorbant |
| 1 | .799 | 45.9 | 114 | 32.3 | 80 |
| 1a | .786 | 45.8 | 112 | 33.3 | 82.2 |
| 2 | .785 | 41.9 | 76 | 12.7 | 37.1 |
| 2a | .800 | 40.9 | 77 | 23.2 | 72 |
| 3 | .712 | 43.3 | 116 | 23.6 | 78.6 |
| 3a | .730 | 42.8 | 111.6 | 27.4 | 81.6 |

EXAMPLE 2

Wood fiber, used for making hardboards or medium density fiberboards, of 4.4% moisture content, was sprayed with a water solution containing 70% of urea formaldehyde and 30% of molasses of pH 8 which contained 5% of ammonium sulfate catalyst. The final resin solids content was 7.25% to oven dry weight of wood. Nonvolatiles content of the solution 65%. Fiberboards of ⅛ inch thickness were made at 300° F. press platen temperature and 15, 20, 25, 30, 35 seconds press time. After cooling to room temperature boards were cut to 1×3 inch test specimens which were then soaked in water for 24 hours and thickness swelling and water absorption determined. Results along with the results of comparative tests using 100% urea formaldehyde adhesive but otherwise identical, are presented in Table 3.

TABLE 3

| No | Molasses % | Urea Formaldehyde % | Press Time seconds | Density lb/ft$^3$ | Thickness Swelling % | Water absorption % |
|---|---|---|---|---|---|---|
| LP 5 | zero | 7.25 | 15 | 50.6 | 43.5 | 72.6 |
| 6 | | | 20 | 60.3 | 32.5 | 46.4 |
| 7 | | | 25 | 61.5 | 30.8 | 38.5 |
| 8 | | | 30 | 50.4 | 28.3 | 66 |
| 9 | | | 35 | 45.9 | 29.4 | 78.5 |
| LP 24 | 2.175 | 5.075 | 15 | 49.3 | 41 | 90 |
| 25 | | | 20 | 54 | 32.8 | 56.7 |
| 26 | | | 25 | 49.9 | 32.2 | 79.3 |
| 27 | | | 30 | 55 | 33.1 | 75.9 |
| 28 | | | 35 | 51.9 | 31.4 | 76.2 |

It is quite clear from thickness swelling results that in 20 seconds both sets of samples, 100% urea formaldehyde samples and samples bonded by a mixture of urea formaldehyde and molasses, were fully cured.

EXAMPLE 3

Douglas fir wood shavings of about 4.5% moisture content were sprayed with water solution containing 70% of urea formaldehyde and 30% of molasses of pH 8, containing 5% of ammonium sulfate catalyst. The final combined solids content of both urea formaldehyde resin and molasses was 7.0% to oven dry weight of wood. Nonvolatiles content of the solution was 65%. Particleboards of ⅜ inch thickness were pressed at 390° F. press platens temperature and 2, 2.25, 2.5, 2.75 and 3 minutes press time. After cooling to room temperature boards were cut to test specimens which were then tested on standard physical properties. Test results for the samples and comparative samples are presented in Table 4.

TABLE 4

| | | Molasses % | Urea formaldehyde % | Press time minutes | Density lb/ft$^3$ | Internal bond psi | Thickness swelling % | Water absorption % |
|---|---|---|---|---|---|---|---|---|
| CC | 1 | zero | 7.0 | 3 | 48 | 126 | 35.3 | 64 |
| | 2 | | | 2.75 | 47.5 | 127.8 | 35 | 66 |
| | 3 | | | 2.5 | 47.7 | 127 | 35.7 | 66 |
| | 4 | | | 2.25 | 47.5 | 127.8 | 34 | 58 |
| | 5 | | | 2 | 44.3 | 124.8 | 36 | 70 |
| CC | 31 | 2.1 | 4.9 | 3 | 43.9 | 91 | 49 | 100.5 |
| | 32 | | | 2.75 | 46.3 | 129.3 | 49.3 | 91.5 |
| | 33 | | | 2.5 | 47.9 | 124 | 48.7 | 85.7 |
| | 34 | | | 2.25 | 46.3 | 124 | 46.4 | 87.8 |
| | 35 | | | 2 | 43.9 | 101.5 | 39.3 | 86.2 |

Physical properties of boards bonded by a mixture of urea formaldehyde resin and molasses are equal to those made by straight urea formaldehyde resin even at very short press times.

The foregoing description of the specific embodiments will so fully reveal the general nature of the invention that others can, by applying current knowledge, readily modify and/or adapt for various applications such specific embodiments without departing from the concept and, therefore, such adaptations and modifications should and are intended to be comprehended within the meaning and range of equivalents of the disclosed embodiments. It is to be understood that the phraseology or terminology employed herein is for the purposes of description and not of limitation.

What is claimed is:

1. A method of bonding particulate wood surfaces and thereby producing a waterproof bonded composite wood product, which comprises providing on surfaces of said particulate wood an amount of a bonding material equal in quantity to 100% of urea-formaldehyde or melamine-formaldehyde condensation resin, said bonding material consisting essentially of about 10–70% of at least one sugar, about 90–30% of an aldehyde resin selected from the group consisting of urea-formaldehyde, melamine-formaldehyde and mixtures thereof, and optionally a catalyst, or a buffer or both so that the bonding material will not decrease the pH after heating of the wood fibers or particles to below about 3.5, and pressing surfaces of the particulate wood together to an elevated temperature and for a time sufficient to effect said bonding to produce said bonded composite wood product, said time and temperature being not substantially greater than the conventional time and temperature when using 100% of urea-formaldehyde or melamine-formaldehyde bonding resin, the resultant bonded composite wood product havino a reduced formaldehyde odor compared with composite wood product made with 100% urea-formaldehyde or melamine-formaldehyde bonding resin.

2. A method according to claim 1 wherein said pressing is steam pressing carried out in the presence of direct contact of the particulate and bonding material with the steam.

3. A method according to claim 1 wherein said sugar is present in an amount, based on the total quantity of bonding material, of 10–40%.

4. A method according to claim 1 wherein said sugar is present in an amount, based on the total quantity of material, of 15–40%.

5. A method according to claim 1 wherein said sugar is present in an amount, based on the total quantity of material, of 30–40%.

6. A method according to claim 1 wherein said sugar and said condensation resin are pre-mixed before application to the wood particles.

7. A method according to claim 1 wherein said sugar and said condensation resin are applied separately in series to the wood particles.

8. A method according to claim 3 wherein the total quantity of bonding material solids is about 4–12% based on the weight of the particulate wood, and pressing is carried out for less than 1 minute at about 100°–125° C.

9. A method according to claim 1, wherein said sugar comprises a mixture of lignin sulfonate and molasses.

10. A method of producing a waterproof bonded composite wood product, comprising applying to surfaces of particulate wood a bonding material consisting essentially of about 10–40% of at least one sugar and about 90–60% of an aldehyde condensation resin selected from the group consisting of urea-formaldehyde resin, melamine-formaldehyde resin and mixtures thereof, and optionally with a catalyst, or a buffer or both so that the bonding material will not decrease the pH of the particulate wood to below about 3.5 after the heating thereof, the quantity of said bonding material solids based on the weight of the wood particles being in the range of about 4–12% and equal in quantity to an amount of straight condensation resin which would be conventionally used to obtain the same degree of bonding, and pressing the particulate wood together at a temperature of about 100°–125° C. for less than about 1 minute to effect said bonding to produce said composite wood product, the resultant bonded composite wood product having a reduced formaldehyde odor compared with composite wood product made with straight urea-formaldehyde or melamine-formaldehyde condensation resin.

11. Composite wood product made according to the process of claim 1.

12. Composite wood product made according to the process of claim 5.

13. Composite wood product made according to the process of claim 7.

14. Composite wood product made according to the process of claim 9.

15. A method for reducing the quantity of urea-formaldehyde or melamine-formaldehyde bonding resin in the bonding of particulate wood surfaces, without increasing substantially the time and temperature of cure and without decreasing substantially the quality of the bond, comprising providing a bonding material comprising urea-formaldehyde condensation resin, melamine-formaldehyde condensation resin or a mixture thereof as bonding agent, and in which bonding material about 10–70% of said condensation resin bonding agent has been replaced by at least one sugar, said bonding material optionally containing a catalyst, a buffer or a mixture thereof so that the bonding material will not decrease the pH after heating of the particulate wood to below a pH value of about 3.5;

providing said bonding material on surfaces of said particulate wood in an amount of about 4–12% based on the weight of the particulate wood, and equal in quantity to an amount of straight condensation resin which would be conventionally used to obtain the same degree of bonding; and pressing the particulate wood together at a temperature of about 100°–125° C. for a time which would be conventionally used to obtain the same degree of bonding using a straight condensation resin, and thereby effecting bonding to produce said composite wood product, the resultant bonded composite wood product having a reduced formaldehyde odor and substantially equivalent bond strength compared with composite wood product made under the same conditions with straight condensation resin.

16. A method according to claim 15 wherein the quantity of condensation resin replaced by sugar is 30–40%.

* * * * *